(12) United States Patent
Fuller

(10) Patent No.: US 6,845,446 B1
(45) Date of Patent: Jan. 18, 2005

(54) PROGRAMMABLE DATA BUS

(75) Inventor: Joseph B. Fuller, Lakewood, CA (US)

(73) Assignee: The Boeing Company, Chicago, IL (US)

(*) Notice: Subject to any disclaimer, the term of this patent is extended or adjusted under 35 U.S.C. 154(b) by 0 days.

(21) Appl. No.: 09/419,335

(22) Filed: Oct. 15, 1999

(51) Int. Cl.[7] .................................................. H04L 9/00
(52) U.S. Cl. ........................................ 713/153; 380/255
(58) Field of Search ................................. 713/153, 151, 713/189, 191–192; 380/255; 710/8, 10, 50, 27, 28, 107, 306; 712/1, 10, 19; 708/522

(56) References Cited

U.S. PATENT DOCUMENTS 5,016,277 A * 5/1991 Hamilton .................... 713/150
5,612,897 A * 3/1997 Rege .......................... 709/219
6,161,184 A * 12/2000 Niimura ...................... 713/200
6,315,662 B1 * 11/2001 Jorasch et al. ................ 463/20

* cited by examiner

Primary Examiner—Gilberto Barrón
Assistant Examiner—G. Gurshman (57) ABSTRACT

A programmable data bus 18,33 for allowing more than one cryptographic mode to be used by the same crypto-engine. The programmable data bus 18,33 has pre-configured parameters electronically stored that are accessed by a message request. Each cryptologic mode has parameters for each component of an encryption module 24. The encryption module is reconfigured based on the parameters stored by a command vector table processor 20. At least one array 32 is configured base on the parameters stored in the command vector table processor 20 to redefine connections between components on the encryption module 42 thereby re-configuring an existing encryption configuration.

12 Claims, 6 Drawing Sheets

PROGRAMMABLE DATA BUS

TECHNICAL FIELD

The present invention relates to a cryptographic engine, and more particularly to a programmable data bus for a cryptographic engine.

BACKGROUND ART

Cryptographic engines, (hereinafter crypto-engines) are used to transform un-encrypted data, also known as Plain-text into encrypted data, or Cipher-text to secure voice and data transmissions from digital communications devices, such as a satellite user terminal. A crypto-engine typically applies a key to the data to modify the data so that it cannot be translated back to plain-text without the same key. There are a variety of cryptographic algorithms that provide a key for encrypting data for security purposes.

Figure 1:
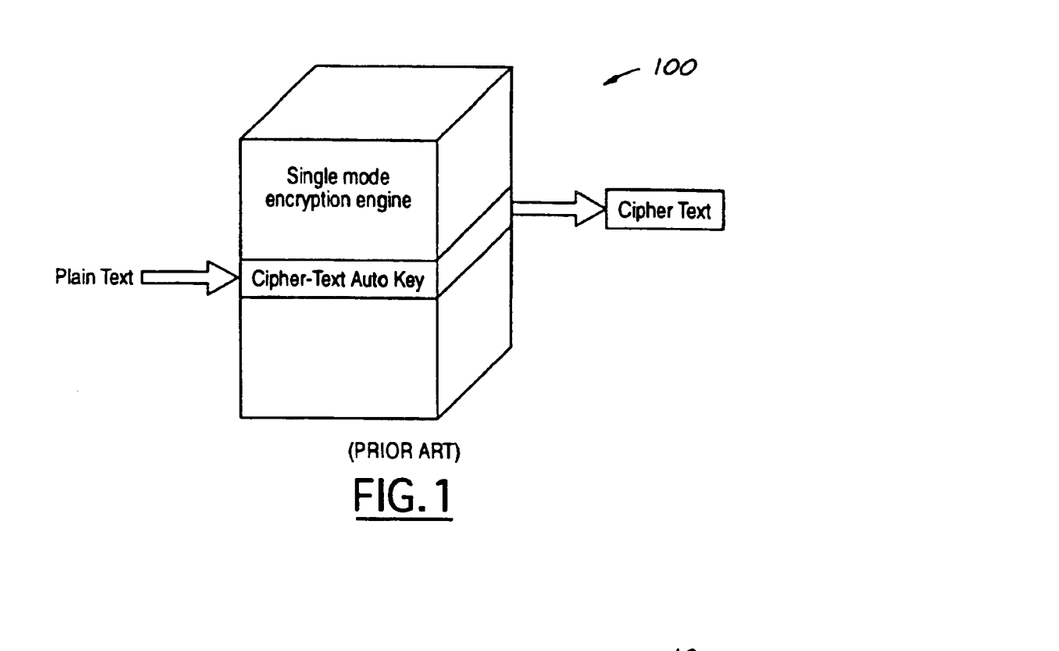
FIG. 1 is a block diagram of a prior art single mode crypto-engine.

There are several cryptologic modes that can be used depending on a specific application. For example, one type of cryptologic mode is used for changing from voice service to data. Another type is used for physical compromise, or operational doctrine change. Typical crypto-engines are limited to a single mode. A single mode crypto-engine 100 is shown in block form in FIG. 1. In the event a change in the cryptologic mode is required, a user must terminate operations, and physically reconfigure the internal components of the cryptographic engine for the newly desired mode. Currently, there is a need for a cryptographic engine that is capable of handling multiple modes of operation without excessive change over requirements.

SUMMARY OF THE INVENTION

The present invention is a programmable data bus that allows for multiple modes of operation to be pre-configured and electronically stored on a data device, such as a credit card device, and then up-loaded to a crypto-engine. The crypto-engine can then be used in more than one mode without having to shut down and physically reconfigure the crypto-engine.

The programmable data bus of the present invention is a series of buses within a bus having both physical and virtual properties based on the desired mode and required configuration for the desired mode. A Systolic Array Mesh Bus (SAMB) represents a group of I/O channel nodes arranged on three separate planes, two of which are virtual and one which is physically discrete. The three-dimensional SAMB has a virtual Channel Processor for managing the external communications.

Each cryptologic mode has parameters for each component of an encryption module used in association with the desired cryptologic mode. The programmable data bus stores the parameters for each cryptologic mode and then retrieves them to configure the crypto-engine when a specific mode is desired. The crypto-engine will remain in a default mode that is altered to a different mode by reconfiguring the components of the programmable data bus based on instructions stored in memory on a user terminal.

It is an object of the present invention to facilitate multiple cryptologic modes within a single secure user terminal. It is another object of the present invention to maintain plain-text and cipher text isolation.

It is a further object of the present invention to implement user access control and physical security for mode changes and crypto-engine reconfiguration. It is still a further object of the present invention to provide a programmable data bus for a secure user terminal.

Other objects and features of the present invention will become apparent when viewed in light of the detailed description of the preferred embodiment when taken in conjunction with the attached drawings and appended claims.

BEST MODE(S) FOR CARRYING OUT THE INVENTION

Figure 2:
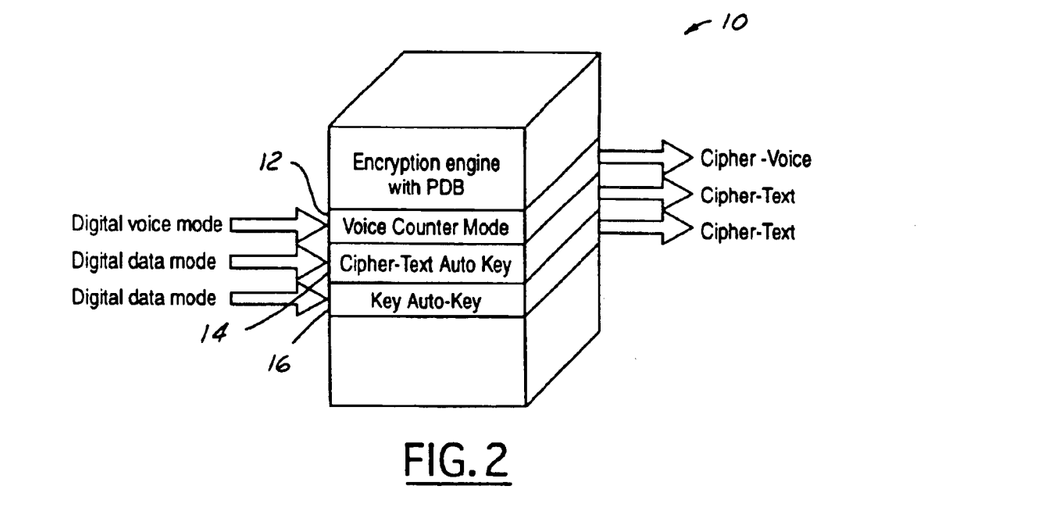
FIG. 2 is a block diagram of a multiple mode crypto-engine of the present invention.

FIG. 2 is a block diagram of an encryption engine 10 having a programmable data bus (not shown) of the present invention. The encryption engine is capable of handling more than one cryptologic mode by reconfiguring the crypto-engine according to parameters stored in the programmable data bus. For example, the crypto-engine 10 can be reconfigured to encrypt digital data from plain-text to cipher-text in any one of several modes. Three modes, Voice Counter Mode 12, Cipher Text Auto Key (CTAK) 14, and Key Auto Key (KAK) 16 are shown.

Figure 3:
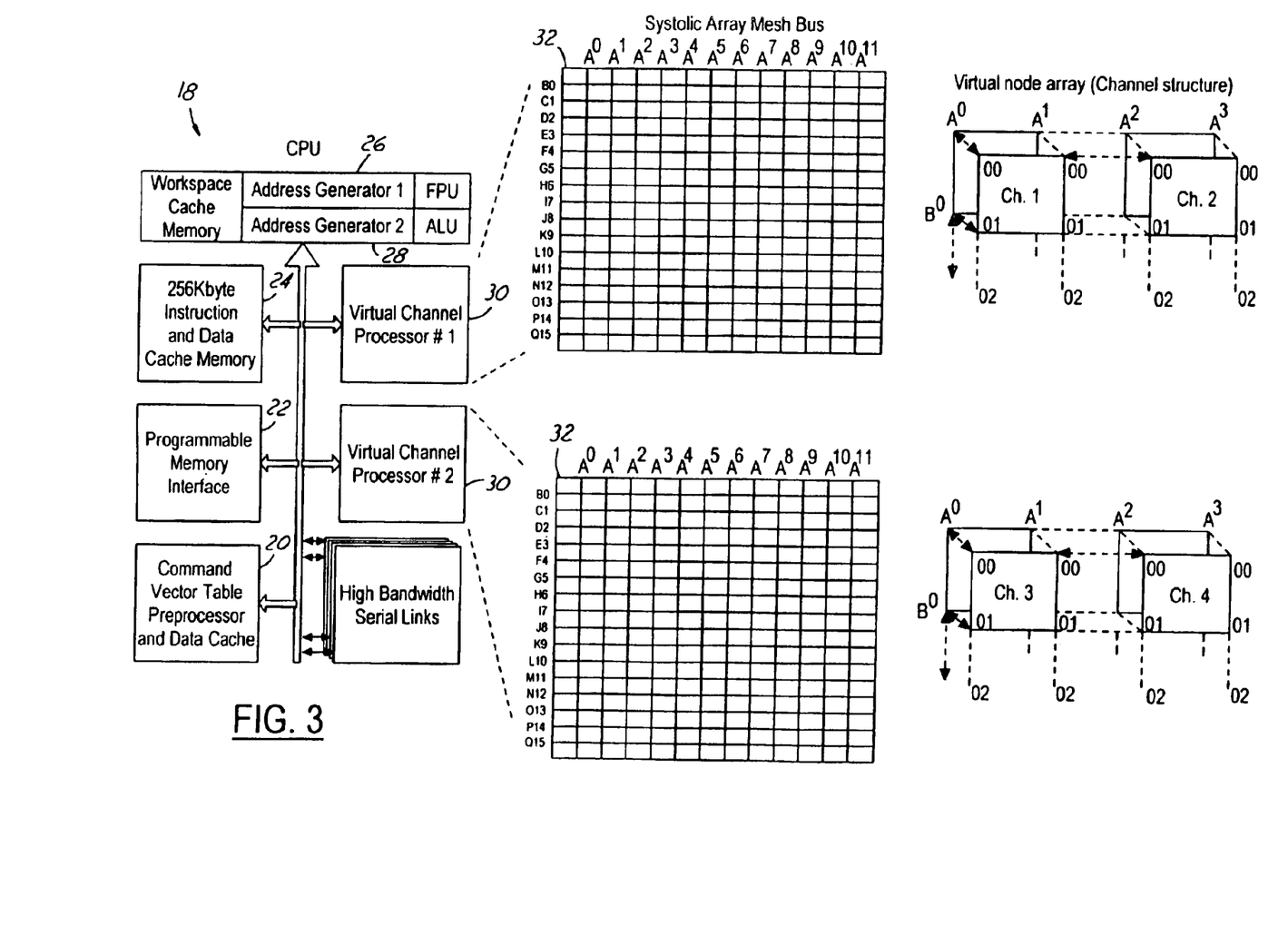
FIG. 3 is a block diagram of the programmable data bus of the present invention and an exploded view of the SAMB.

FIG. 3 is a block diagram of the programmable data bus 18 of the present invention. The programmable data bus 18 receives data to be encrypted, voice or otherwise, from a piece of digital communications equipment that utilizes cryptography (not specifically shown), for example, a user terminal. The programmable data bus 18 has a Command Vector Table Preprocessor 20 where a Command Vector Set (CVS) is stored for each encryption mode. The CVS holds the information required for establishing the connection paths necessary to implement the desired encryption mode and will be discussed in detail later.

A programmable memory interface 22 determines how much memory is needed to execute instructions and assigns the memory accordingly. The instruction and data cache memory 24 is where the actual operating system is housed. A first address generator 26 and a second address generator 28 are provided for processing a floating point unit (FPU) and an arithmetic logic unit (ALU).

At least one virtual channel processor (VCP) 30 provides a method of managing the external communications. The VCP receives the directions from the CVS and implements the routing to facilitate connection paths as directed by the CVS.

A systolic array mesh bus (SAMB) 32 is a three-dimensional array that represents a group of I/O channel nodes arranged on three separate planes, x, y, and z. The x and y planes are virtual (soft) nodes and the z plane is physically discrete (hard). The array 32 corresponds to lines between the nodes and represents both source and destination address channels, i.e. Channel 1, 2, 3 and 4 as shown in the exploded view of the SAMB 32 in FIG. 3. In the present example, the dimensions of the array are eight times the size of the cryptographic state space register which is described below.

The programmable data bus 18 maps the command vector set (CVS), that has been stored in on-board memory 20, to the virtual channel processor 30 and subsequently configures the systolic array 32 where the appropriate connections are facilitated and the desired mode is thereby configured.

Figure 4:
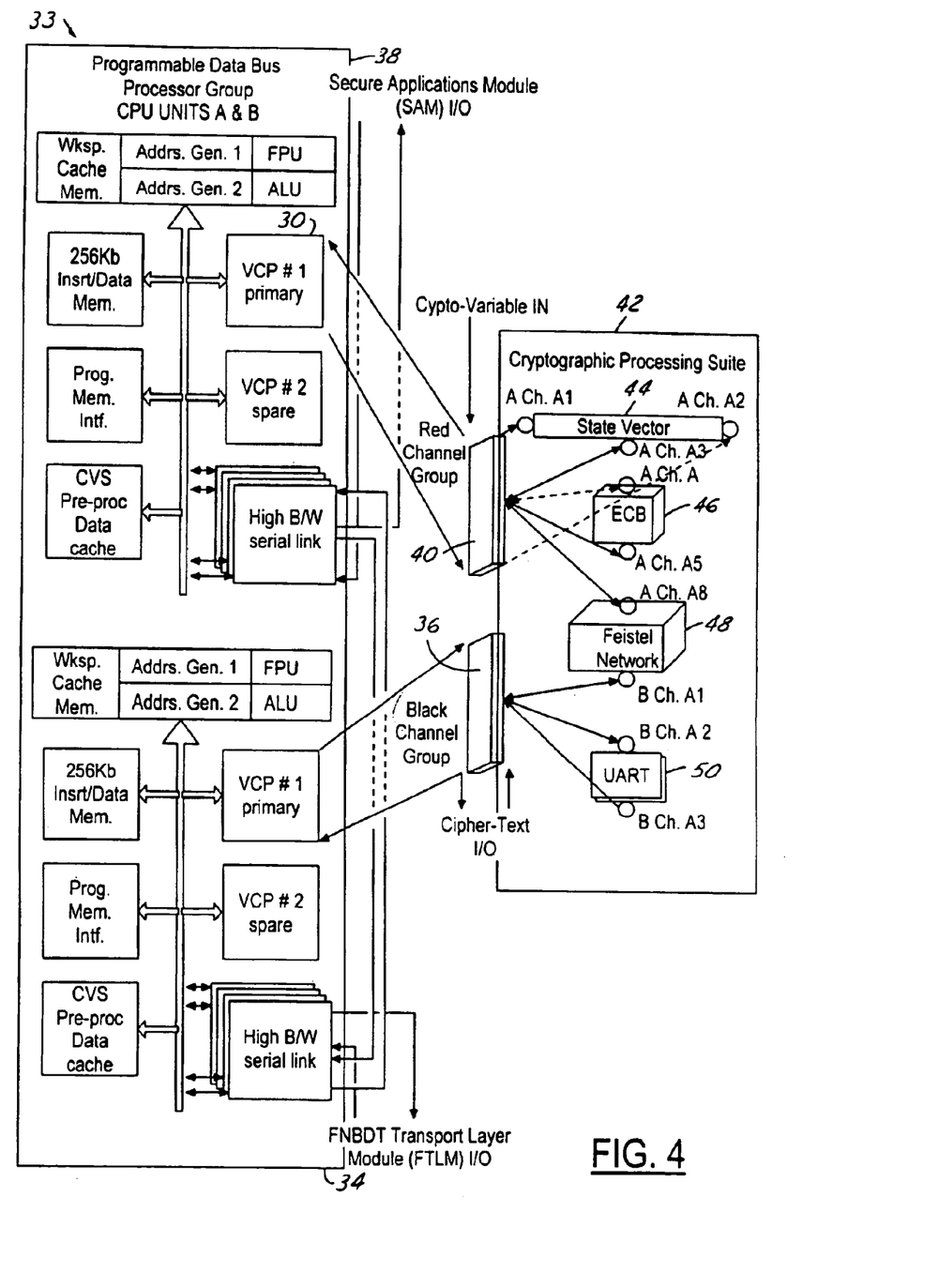
FIG. 4 is a block diagram of an embodiment of the programmable data bus of the present invention having more than one controller.

In another embodiment of the present invention, the programmable data bus 33 may have first and second, separate and distinct, controllers as shown in FIG. 4. The first controller 34 defines a "black" sub-module 36 and may be dedicated to cipher-text functions. The second peripheral interrupt controller 38 defines a "red" sub-module 40 and may be dedicated to plain-text functions.

The separate and distinct "black" and "red" sub-modules 36, 40 operate in unison but remain physically and cryptologically isolated. This is necessary for Red/Black isolation. In other words, the functions associated with the plain-text, prior to it being encrypted remain isolated from the cipher-text and do not interfere with the functions of the user terminal (not shown).

In the embodiment shown in FIG. 4, a first microprocessor 34 communicates with a first systolic array mesh bus (SAMB) associated with the Black sub-module 36 and has a distinct channel group. A second microprocessor 38 is associated with the Red sub-module 40 and has its own distinct channel group. The SAMB's are physically configured based on information from the CVS that is stored in the programmable data bus 33 to configure an encryption module 42 for the desired cryptographic mode.

Typically, an encryption module 42 includes a state vector 44, an electronic code book 46, a network containing the encryption algorithm 48 (a Fiestel Network in the present example), and a universal asynchronous transceiver 50 for handling I/O. The encryption module 42 is configured, and reconfigured, by the programmable data bus 33 based on the parameters received from the VCP's 30, for different encryption modes, i.e. Counter Mode, CTAK, KAK, etc. The electronic code book 46 contains the algorithm used to create the keys necessary for encrypting and decrypting data.

The programmable data bus 18, 33 has a default mode. For example purposes, the default is Counter Mode and is shown the flow chart in FIG. 5. For Counter Mode, part of an initialization vector 60 is used as a next-state function to increment the initialization vector value that occupies a state space register 62. The initialization vector 60 is modified in the state space register 62, as by a Galois configuration, and becomes a state vector 46. The state vector 46 is used to initiate a next-state function while acting upon the electronic code book 46. A key 64 is provided to the electronic code book 46. A crypto-variable 66 specifies the uses and restrictions for the key 64. The crypto-variable 66 undergoes an exclusive-or function with the key 64 to encrypt a session key 68.

Figure 5:
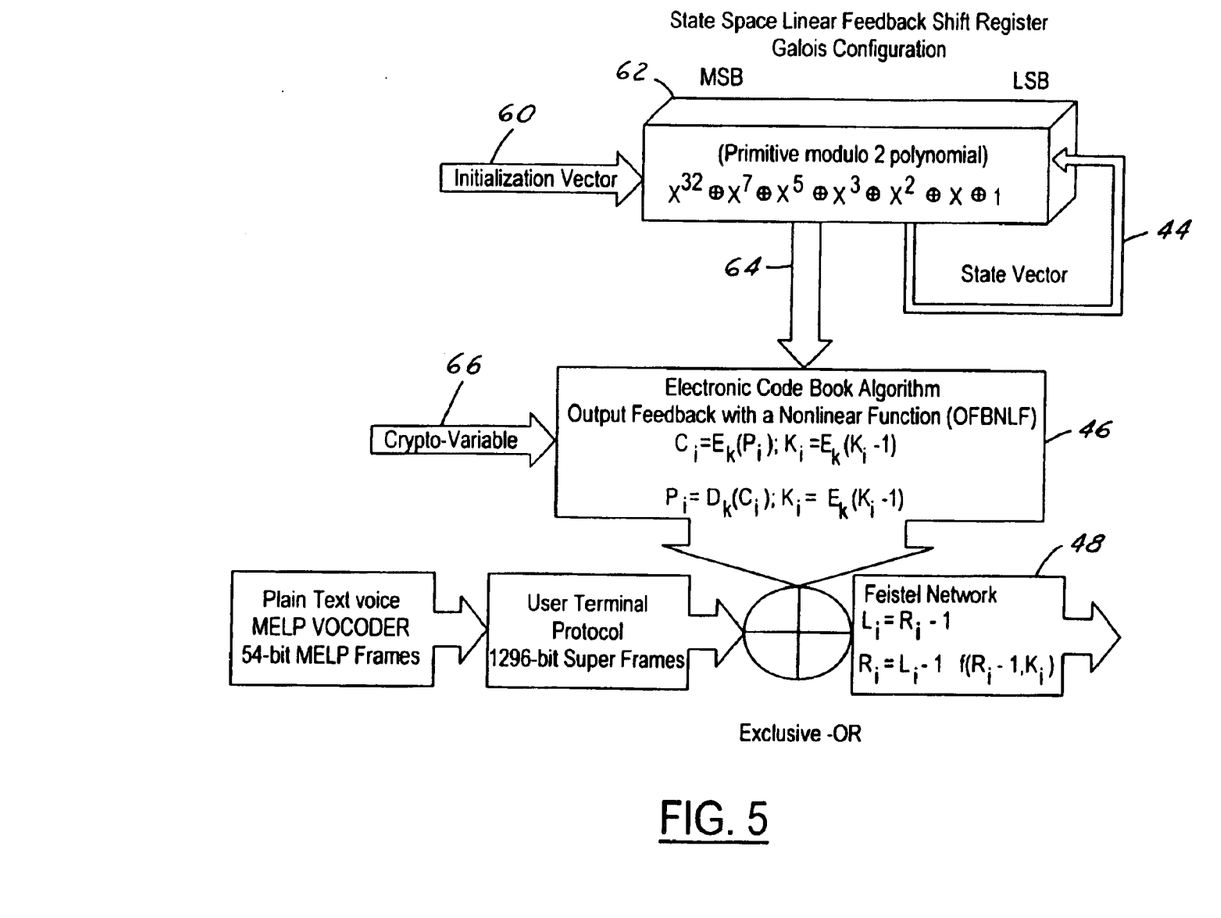
FIG. 5 is a flow chart for Counter Mode.

In general, the following subcomponents of the encryption module 42 are configured:

State Space Register Configuration
Initialization Vector Injection Point
State Vector Injection Point
Message Indicator Feedback (if required)
Crypto Variable Injection Point
Electronic Codebook Configuration and
Feistel Network Counter Mode Anti-Spoof (if required).

The Command Vector Set (CVS), stored in on-board memory 20 for the specific mode of encryption, provides the essential connection paths for all of the critical components required to encrypt, and decrypt, data. The CVS is mapped to the Virtual Channel Processor (VCP) 30 and subsequently to the SAMB 32 at which point the appropriate connections are facilitated for the mode change. The VCP 30 provides a method of managing the external communications to facilitate connection paths created by the CVS. The CVS should be classified at the same level of security as the encryption algorithm.

For security purposes the CVS should be stored along with the respective cryptographic keying variables 66 on a removable smart card or Single Inline Memory Module (SIMM). Upon inserting the smart card in the user terminal and establishing all of the necessary physical connections, the transfer of the CVS maps and keys will be facilitated through some form of secure transport between the card and the SAMB configuration register in the encryption module.

For example, the security and transfer of the CVS and keys could be accomplished through some form of secure user defined protocol in which the static keys and CVS are protected and transferred in a benign state by algorithms, such as Joseki and Accordian. Operational cryptographic variables (keying materials) could then be substituted for the initial cryptographic variables as required by established Over the Air Re-key (OTAR) techniques and the NSA Electronic Key Management System (EKMS).

Figure 6:
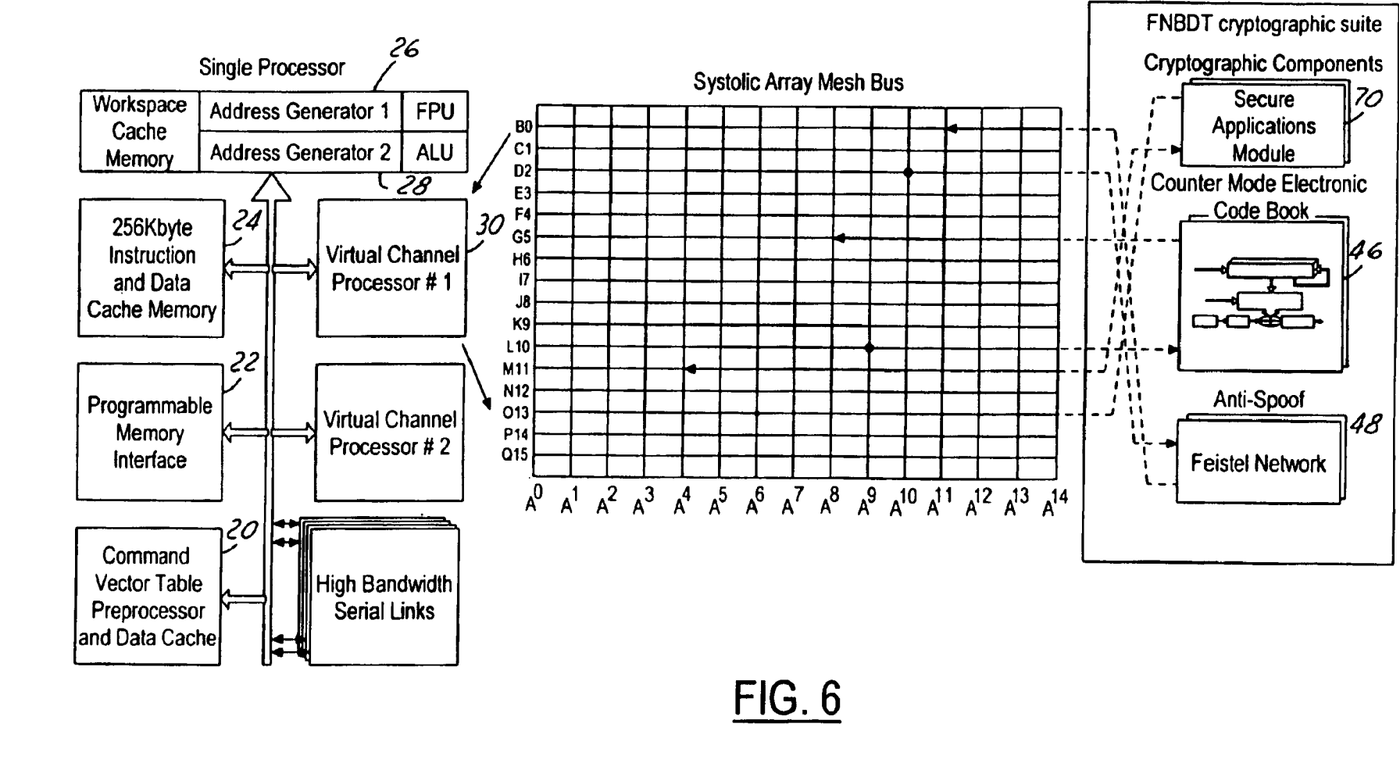
FIG. 6 is a diagram of the programmable data bus of the present invention and the configuration of the external input/output connections.

The operation of the programmable data bus, with respect to the SAMB, is best described by referring to FIG. 6. When a cryptographic mode is selected, the Command Vector Table 20 passes the required CVS and maps parameters to the address generators 26 and 28 by way of the programmable memory interface 22 and instruction and data cache memory 24. The mode change request is executed by the address generators 26 and 28 and sent to the virtual channel processor 30. Any self-test and alarm functions are performed at this time. The system implements user access control and physical security when initializing a mode change and reconfiguration.

In the present example, the SAMB's tasking code and systems files are written primarily in ADA-95 due to readability, re-usability, the ability to facilitate concurrent executables through rendezvous tasking and the support for secure programming. Concurrent programming and procedure code is written in C++ because it has primitive constructs that support concurrency and lends itself to distributed execution.

Figure 7:
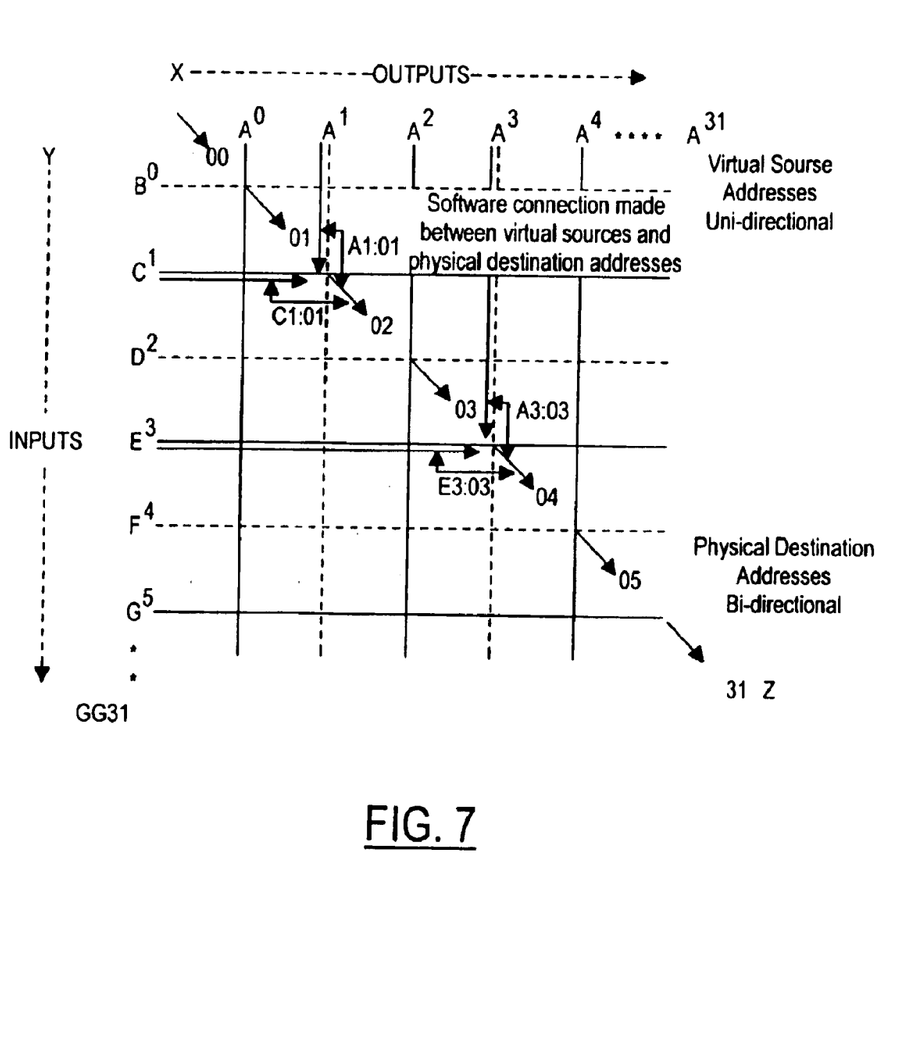
FIG. 7 is a partial view of the cross section of the Systolic Array Mesh Bus depicting connection points between the virtual source and the physical destination addresses.

The SAMB 32 is directed by the VCP 30 to implement the proper connections such that the desired encryption mode, (i.e. Counter Mode for the present example), is configured. Referring now to FIG. 7, the SAMB will be described in detail. The vertical soft plane, or y-plane, has 32 element positions labeled A0 through A31. The horizontal soft plane, x-plane, has 32 element positions labeled B0 through EE31. The diagonal hard plane, z-plane, has 32 element positions labeled 00 through 31. Each connection node of the SAMB has an input with a corresponding output.

Outputs are represented by the alphanumeric designator, or address, on the vertical soft channels, A0 through A31. Inputs are represented by alphanumeric designators on the horizontal soft channels, B0 through GG31. The physically discrete, or hard, connections are hard-wired to their respective components in the encryption module.

Referring back to FIG. 6, the relationship between the virtual node connections of the SAMB and the encryption mode is shown. A Feistel Network 48 has been assigned a soft channel output B0-A11, and a soft channel input D2-A10. A secure applications module 70 (a module that is specific to the user terminal) has been assigned a soft channel output 013-A6 and a soft channel input M11-A4. The electronic code book 46 has been assigned a soft channel output G5-A8 and soft channel input L10-A9. The hard channel assignments are not shown in FIG. 6, but would be hard channel 10 for the Peistel network, hard channel 06 for the Secure Applications Module, and hard channel 08 for the Electronic Code Book.

Referring back to FIG. 3, a three-dimensional perspective view of a portion of the SAMB 32 is shown and is a better representation of the hard channels. The hard channels are identified by 00, 01, 02, etc. A physical node, i.e. Channel A1 and Channel A2, corresponds to an encryption module sub-component connection is defined by the command vector pointer register and the command vector destination address.

The connections between the virtual and physical nodes are executed in C++ code. Concurrent programs in C++ are used to express channel inputs and outputs that are setup and initialized using parallel and alternative constructs. Each channel specifies a communication path between two concurrent processes, where communication is synchronized and it can only take place when both processes are ready for a rendezvous.

The input and output message instructions use the channel address to determine whether the channel is hard or soft. Therefore, the process can be designed and compiled without specifying how the channels are connected, i.e., local and remote rendezvous are transparent to the application. When a message is passed by way of a hard channel, the output process is de-scheduled, thereby allowing other processes to execute while the message transfer is taking place. After the message transfer, the waiting process is rescheduled and continues its execution.

It is possible to have multiple source and destination addresses. Higher bandwidths with a reduction in latency are achievable by introducing parallel data paths. This is possible because every address intersection of the array has I/O capability.

The programmable data bus of the present invention allows an encryption module to be configured for a desired cryptographic operating mode without a change in operational doctrine or transmission mode. The essential sub-components of the encryption module can be rapidly de-configured and re-configured. A mode change can be initiated automatically or manually.

The separation of functions is such that it does not interfere with the overall effective operation of the user terminal and the implementation of the protocol inter-working functions.

The programmable data bus of the present invention may consist of two complete, yet independent, systems. One sub-module is used specifically for plain-text, or "red", functions while the other sub-module is used for cipher-text, or "black", functions. The sub-modules operate simultaneously, but are physically and cryptologically isolated from each other maintaining red/black isolation.

The encryption module is contained within the user terminal and therefore the system includes a method of preventing unauthorized use, unauthorized access, unapproved mode of use, change or disabling of a mode, or the inspection of specific cryptographic mode method implementation. The security features do not change or alter the user terminal and comply with established security requirements, such as the Department of Defense CONDOR Security Requirements Doctrine (SRD).

The programmable data bus of the present invention utilizes a unique set of IVT maps in order to effect a specific cryptographic change. The absence of CVS's disables all of the essential sub-components of the encryption module and denies access to such capabilities and functions. The CVS maps can be co-located and loaded along with required cryptographic keying variables and any other access control mechanisms.

It should be noted that while the present invention is being described in a preferred embodiment, it is possible to modify the present invention without departing from the scope of the appended claims. For example, the programmable data bus may be implemented in a gate array as opposed to the systolic array described herein. Accordingly, it is intended that the invention be limited only in terms of the appended claims.

What is claimed is:

1. A programmable data bus comprising:
   a command vector table processor having a command vector set for storing predetermined configuration instructions corresponding to a plurity of encryption modes;
   a programmable memory interface in communication with said command vector table processor for signing memory locations;
   an operating system in communication with said programmable memory interface for executing predetermined configuration instructions selected from said command vector set;
   at least one systolic array mesh bus having soft and hard channels that are configured by said predetermined configuration instructions from said command vector set;
   at least one virtual channel processor for facilitating connections to configure said systolic array mesh bus; and
   reconfigurable encryption module in communication with said at least one virtual channel processor, said programmable data bus initiates an encryption mode by retrieving said predetermined configuration instructions stored in said command vector set and reconfiguring said encryption module by altering connections between said soft and hard channels in said systolic array mesh bus according to said predetermined configuration instructions.

2. The programmable data bus as claimed in claim 1 further comprising a first systolic array mesh bus and a first virtual channel processor dedicated to plain-text functions and a second systolic array mesh bus and a second virtual channel processor dedicated to cipher-text functions.

3. The programmable data bus as claimed in claim 1 wherein said at least one systolic array mesh bus further comprises an array symmetry having x, y, and z planes orthogonal to each other.

4. The programmable data bus as claimed in claim 3 wherein said x and y planes having virtual addresses and said z plane having discrete addresses.

5. The programmable data bus as claimed in claim 1 wherein said instruction to reconfigure said reconfigurable encryption module is received from a Single Inline Memory Module.

6. The programmable data bus as claimed in claim 1 wherein said reconfigurable encryption module has a default mode.

7. A reconfigurable encryption module comprising:

at least one systolic array mesh bus having virtual and discrete nodes in a three dimensional arrangement, said virtual nodes arranged in two planes on orthogonal axes and said discrete nodes arranged in a third plane on an axes orthogonal to said virtual node planes;

at least one virtual channel processor for facilitating connections between said virtual and discrete nodes;

a command vector set for providing stored predetermined configuration instructions to said virtual channel processor, said predetermined configuration instructions correlate to a desired encryption mode in a plurality of possible encryption modes;

an operating system for receiving said stored predetermined configuration instructions to change an encryption mode and executing said stored predetermined configuration instructions to direct said command vector set to said virtual channel processor.

8. The reconfigurable encryption module as claimed in claim 7 further comprising a first systolic array mesh bus and a first virtual channel processor dedicated to plain-text functions and a second systolic array mesh bus and a second virtual channel processor dedicated to cipher-text functions.

9. The reconfigurable encryption module as claimed in claim 7 wherein said at least one systolic array mesh bus further comprises an array symmetry having x, y, and z planes orthogonal to each other.

10. The reconfigurable encryption module as claimed in claim 9 wherein said x and y planes having virtual addresses and said z plane having discrete addresses.

11. The reconfigurable encryption module as claimed in claim 7 wherein said stored predetermined configuration instruction to reconfigure said reconfigurable encryption module is received from a Single Inline Memory Module.

12. The reconfigurable encryption module as claimed in claim 7 further comprising a default mode.

* * * * *